US008636079B2

(12) United States Patent
Totsu (10) Patent No.: US 8,636,079 B2
(45) Date of Patent: Jan. 28, 2014

(54) METHOD OF OPERATING A ROTARY TOOL (76) Inventor: Katsuyuki Totsu, Sumida-ku (JP)

( * ) Notice: Subject to any disclaimer, the term of this patent is extended or adjusted under 35 U.S.C. 154(b) by 194 days.

(21) Appl. No.: 12/924,934

(22) Filed: Oct. 8, 2010

(65) Prior Publication Data
US 2011/0030981 A1 Feb. 10, 2011

Related U.S. Application Data (62) Division of application No. 11/658,235, filed as application No. PCT/JP2005/011932 on Jun. 29, 2005, now abandoned.

(30) Foreign Application Priority Data

Jul. 23, 2004 (JP) ................................. 2004-215372
Sep. 1, 2004 (JP) ................................. 2004-254480

(51) Int. Cl.
H02P 7/00 (2006.01)

(52) U.S. Cl.
USPC .......... 173/1; 173/5; 173/6; 173/11; 173/178; 173/180; 173/181; 173/104; 173/170; 173/217; 310/50; 318/281; 318/434

(58) Field of Classification Search
USPC ........... 173/5–6, 11, 178, 180–181, 104, 170, 173/217, 1; 310/50; 318/281, 434
See application file for complete search history.

(56) References Cited

U.S. PATENT DOCUMENTS

| 3,660,718 | A | 5/1972 | Pinckaers |
| 3,845,373 | A | 10/1974 | Totsu et al. |
| 4,156,262 | A | 5/1979 | Eller et al. |
| 5,701,961 | A | 12/1997 | Warner et al. |
| 5,831,402 | A | 11/1998 | Yang |
| 6,536,536 | B1 | 3/2003 | Gass et al. |
| 6,923,268 | B2 | 8/2005 | Totsu |
| 7,063,171 | B2 | 6/2006 | Totsu |
| 7,556,103 | B2 | 7/2009 | Matsunaga |
| 2003/0222516 | A1* | 12/2003 | Cleanthous et al. ............ 310/50 |
| 2004/0050566 | A1 | 3/2004 | Totsu |
| 2004/0115014 | A1 | 6/2004 | Totsu |
| 2009/0241744 | A1 | 10/2009 | Matsunaga |

FOREIGN PATENT DOCUMENTS

| JP | 54-43398 | 4/1979 |
| JP | 57-43389 | 9/1982 |
| JP | 4-82678 | 3/1992 |
| JP | 2002-254346 | 9/2002 |
| JP | 2002-321166 | 11/2002 |
| JP | 2004-66413 | 3/2004 |
| WO | WO 02/068156 | 9/2002 |
| WO | WO 02068156 A1 * | 9/2002 ............. B25B 23/14 |

* cited by examiner

Primary Examiner — Michelle Lopez
(74) Attorney, Agent, or Firm — DLA Piper LLP (US)

(57) ABSTRACT

A method of operating a rotary tool driven by a brushless motor including a DC brushless motor for rotationally driving a rotary bit, a torque setting clutch mechanism, a drive switch for drive-controlling a drive control circuit of the brushless motor, and a control means to rotationally drive the brushless motor by an operation of the drive switch and wherein the method includes a first step for stop-controlling of the drive control circuit, a second step for rotating forward or in reverse the brushless motor through the control and a third step for control-operating a semiconductor of an inverter circuit provided in the drive control circuit to short-circuit the magnetizing windings of the brushless motor, thus braking the rotor of the brushless motor and stopping the brushless motor.

3 Claims, 4 Drawing Sheets

METHOD OF OPERATING A ROTARY TOOL

TECHNICAL FIELD

The present invention relates to a rotary tool such as an electric (power) driver driven by a brushless motor that uses a three-phase DC brushless motor as its drive motor and more particularly to a rotary tool driven by a brushless motor in which Hall elements are used as magnetic sensors so that a selection is made, depending upon the nature of the work done by the rotary tool, for effecting drive control of the brushless motor by a desired push operation system or lever operation system and so that when a load torque of or greater than a prescribed preset value acts on the rotary tool, a clutch action of a torque setting clutch mechanism is detected so as to stop the brushless motor; as a result, a control means that controls the drive action of the brushless motor can be made small and compact and entirely accommodated and deployed inside the grip casing of the rotary tool, and the rotary tool is ensured that long maintenance-free life is realized by implementing an entirely non-contact configuration, constant torque tightening work for screws or the like can be performed properly and efficiently, and torque control precision enhancement is easily realized.

BACKGROUND ART

Previously, the applicant proposed a screw tightening apparatus provided with an automatic conduction interrupting device. In this automatic conduction interrupting device, when an excessive load current flows in the electric power driver due to an outside torque, the excessive load current is electrically detected, so that conductivity to the motor is interrupted, and, at the same time, the armature of the motor is short-circuited, and electrical braking is applied to the motor, thus instantaneously stopping the rotation of the motor (see Patent Literature 1). More specifically, in the screw tightening apparatus described in Patent Literature 1, a switching circuit is provided in the electric power driver which has a driver shaft rotationally driven by the motor; and in case that a load current, which flows when the motor is driven, changes to an excessive load current of or greater than a prescribed value, then such an load current is detected, and the supply of motor drive current is interrupted, so that, after a certain time interval has elapsed, the supply of motor drive current is restored, and with which also a switching mechanism is provided in the motor armature circuit, and when the switching circuit acts to interrupt the supply of motor drive current, the motor armature circuit is short-circuited, electrical braking is thereby applied to the motor, and thus the rotation the motor is instantaneously stopped.

Conventionally, moreover, DC motors have been commonly used as drive motors for electric power driver. Today, use of brushless motors as DC motors is proposed and practically implemented for the reasons that brushless motors exhibit superior characteristics in terms of non-contact configuration, noise prevention, high-torque miniaturization, high-speed turning, and long life, and that they have the advantage of being maintenance-free.

The above-described brushless motor, however, unlike the case of a conventional DC motor, when drive-controlling a three-phase DC brushless motor, for example, a drive circuit for generating a turning magnetic field is required. Such a drive circuit can be comprised of magnetic sensors (for which Hall elements are generally used) for detecting the position of the magnetic poles of the magnet rotor, drive coils (three-phase coils) magnetized so as to impart a turning force in a certain direction in correspondence with the positions of the rotor magnetic poles, and a dedicated IC circuit (inverter circuit comprising a three-phase full-wave bridge configuration) for controlling the energizing of those magnetic sensors and drive coils.

In view of the above, the applicant has proposed a drive switch system for an electric (power) rotary tool, as an electric (power) rotary tool that utilizes the brushless motor described above, which, according to the nature of the work being done, can selectively effect drive control based on a desired push operation system or lever operation system (see Patent Literature 2).

More specifically, the electric (power) rotary tool drive switch system described in Patent Literature 2 is configured such that (1) the electric (power) rotary tool is comprised of: an electric motor, a rotary bit, such as a driver bit for performing such work as tightening a screw, coupled to the output shaft of the electric motor, a drive switch for driving the electric motor and starting the above-described work by the rotary bit, a torque detection means for detecting the load torque developed in the rotary bit associated with the completion of the work, and a torque setting automatic stopping means for stopping the rotary bit when the load torque reaches a preset torque value; and in this rotary tool, (2) a push operation type drive switch for effecting ON action by bringing the rotary bit up against a screw or other work and causing a pushing-pressure displacement, and (3) a lever operation type drive switch for effecting ON action by pushing-pressure displacing a switch lever provided in the grip of the electric (power) rotary tool, are respectively provided in combination of magnets and magnetic sensors; and (4) the magnetic sensors are respectively connected to the conducting circuit for the electric motor, and one or other of the operation systems is selected; and, by the magnetic sensing action of the magnetic sensors of the selected operation system, the conducting circuit is subjected to an ON action, so that the electric motor is started.

Accordingly, in the electric (power) rotary tool drive switch system configured in the manner described above, when a brushless motor is used as its electric motor, it is possible to accommodate and deploy everything, including the drive switches and a drive control circuit of the motor, compactly inside the grip casing of the electric (power) rotary tool, and long maintenance-free life is achieved by implementing thoroughgoing non-contact and maintenance-free configuration, thus simplifying the way the tool is used.

The applicant further proposed a torque control system for an electric (power) rotary tool. In this torque control system, constant torque tightening work for screws or the like can always be achieved properly and efficiently, and overall downsizing and improved torque control precision enhancement of the tool is easily accomplished (see Patent Literature 3).

More specifically, in the torque control system for an electric (power) rotary tool described in Patent Literature 3, (1) a grip housing an electric motor therein is provided, a follower shaft is coupled, as a work shaft, through a speed reduction mechanism to the output shaft of the electric motor, a clutch mechanism is provided that comprises a cam engagement unit for operating so as to break the coupling between the output shaft and the follower shaft when a load torque of or greater than a prescribed value acts on the follower shaft, a torque setting in which the clutch action point of the clutch mechanism is regulated as a torque setting value is provided, and a torque detection mechanism for detecting the clutch action of the clutch mechanism and simultaneously effecting drive stop-control on the electric motor is provided; and (2)

the above-described torque detection mechanism is set so that, when the cam engagement in the cam engagement unit of the clutch mechanism is completely released and the clutch action is finished, the electric motor is subjected to a drive stop-control simultaneously with such detection action.

In this torque control system for an electric (power) rotary tool, the torque detection mechanism is composed of a combination of magnets and magnetic sensors; and when the cam engagement is completely released, a detection action is effected. Accordingly, it is possible to eliminate occurrences of switch contact sparking and wear and also damages imparted to the peripheral electronic equipment and electronic circuitry as occurred in torque detection mechanisms that use a conventional mechanical switch mechanism; and it is further possible to make the parts smaller in size and have a longer life and to make the overall electric power tool size compact.

Patent Literature 1: Japanese Patent Application Publication (Kokoku) No. 557-43389/1982
Patent Literature 2: Japanese Patent Application Laid-Open (Kokai) No. 2002-254346
Patent Literature 3: Japanese Patent Application Laid-Open (Kokai) No. 2002-321166

DISCLOSURE OF INVENTION

Problems the Invention Attempt to Solve

In the above-described electric (power) rotary tool that uses the drive switch system of Patent Literature 2 and in the above-described electric (power) rotary tool that uses the torque control system of Patent Literature 3, so as to realize long maintenance-free life by implementing a thoroughgoing non-contact configuration therein, a brushless motor is used, and further a switch mechanism for drive-controlling the brushless motor can be an electronic switch formed by a combination of magnets and magnetic sensors. With this configuration, it is possible to obtain an electric (power) rotary tool exhibiting all of the advantages disclosed, respectively, in Patent Literature 2 and Patent Literature 3, described above.

As a result, the inventor, after conducting assiduous research and numerous tests, has made a unique rotary tool driven by a brushless motor. This rotary tool includes: a DC brushless motor for rotationally driving a rotary bit, a speed reduction mechanism coupled to the output shaft of the brushless motor, a torque setting clutch mechanism provided in a shaft-coupling portion for coupling the speed reduction mechanism and the rotary bit, a lever operation mechanism and a push operation mechanism capable of selectively operating as a drive switch for drive-controlling the drive control circuit of the brushless motor, and a control means configured so as to rotationally drive the brushless motor by a lever operation or push operation of the drive switch and so as to stop the rotational drive of the brushless motor by detecting clutch action of the clutch mechanism; and in this rotary tool, Hall elements, comprising magnetic sensors, are provided respectively for the lever operation mechanism and the push operation mechanism, both being the drive switch for the brushless motor, so as to respectively detect the lever operation and the push operation, and a further Hall element is further proved for the clutch mechanism so as to detect the clutch actions, so that the drive control circuit of the brushless motor is drive-controlled to rotationally drive the brushless motor based on the drive switch operation signal from one of the first Hall elements, and so that the drive control circuit of the brushless motor is stop-controlled to stop the brushless motor based on the clutch mechanism action signal provided from the second Hall element.

In other words, the inventor ascertained that, in the rotary tool driven by a brushless motor of the above-described structure, constant torque tightening work for screws or the like can always be performed properly and efficiently, and overall downsizing and improved torque control precision enhancement of the rotary tool is easily achieved, and, in addition, it is possible to eliminate occurrences of switch contact-induced sparking and wear, and damages imparted to the peripheral electronic equipment and electronic circuitry as occurred in drive switches or torque detection mechanisms that use a conventional mechanical switch mechanism, so that the constituting parts are able to have a reduced size and an extended life.

Furthermore, in the above-described rotary tool driven by a brushless motor of the present invention, the drive control circuit of the brushless motor is comprised of an AC/DC conversion means connected to a commercial power source for obtaining a power supply voltage for driving the brushless motor, an inverter circuit comprising a semiconductor bridge configuration for converting the power supply voltage into a brushless motor drive voltage, a drive circuit for appropriately ON/OFF-controlling a semiconductor that comprises the bridge configuration of the inverter circuit, and a position detection circuit for detecting the position of the rotor with respect to the magnetizing windings in the brushless motor; and the above-described control means outputs to the drive circuit a control signal which is for switching the current supplied to the magnetizing windings by a position detection signal detected by the position detection circuit.

In this structure, the inventor ascertained that, when stop-control the drive control circuit of the brushless motor is performed based on the clutch mechanism action signal from the second Hall element provided for the clutch mechanism, for example, a setting can be made so that when the drive power for the brushless motor is interrupted, the semiconductor that comprises the bridge configuration of the inverter circuit provided in the drive control circuit of the brushless motor is operated so as to short-circuit the magnetizing windings of the brushless motor, so that the rotor is stropped; as a result, it is possible to abruptly brake the brushless motor rotor and even further enhance torque control precision in screw tightening work.

Moreover, such setting can be provided that, even in cases where, for the respective lever operation mechanism and push operation mechanism capable of selectively operating as the drive switch for drive-controlling the drive control circuit of the brushless motor, the lever operation or the push operation thereof is suspended, the drive power for the brushless motor is interrupted, as described earlier, the semiconductor that comprises an inverter circuit bridge configuration provided in the drive control circuit of the brushless motor is operated so as to short-circuit the magnetizing windings of the brushless motor, and the rotor is thus braked. The inventor ascertained that, with an employment of such a configuration as described above, in screw fastening and unfastening work, when the drive switch is interrupted, the driver bit is prevented from freewheeling, so that both work safety and improved work rapidity are easily accomplished.

An alternative proposal is also provided. In particular, the rotary tool driven by a brushless motor according to the present invention can be configured so that it comprises: a DC brushless motor for rotationally driving a rotary bit, a speed reduction mechanism coupled to the output shaft of the brushless motor, a load current detection means for detecting the load current of the brushless motor, a lever operation mechanism and a push operation mechanism which can be selectively operated as a drive switch for drive-controlling the drive control circuit of the brushless motor, and a control means configured so as to rotationally drive the brushless motor by a lever operation or push operation of the drive switch and to stop the brushless motor when the load current detected by the load current detection means exceeds a preset value; and in this structure, for the respective lever operation mechanism and push operation mechanism, both being the drive switch for the brushless motor, Hall elements, functioning respectively as magnetic sensors, are respectively provided so as to respectively detect the lever operation and the push operation, so that the drive control circuit of the brushless motor is drive-controlled to rotationally drive the brushless motor, based on the operation signal of the drive switch provided by one of the Hall elements, and so that when the load current detected by the load current detection means exceeds a set value, then the drive control circuit of the brushless motor is stop-controlled to stop the rotational drive of the brushless motor.

Accordingly, in the rotary tool driven by a brushless motor as described above, in like manner as described earlier, constant torque tightening work for screws or the like can always be performed properly and efficiently, and overall downsizing and improved torque control precision enhancement of the rotary tool can be easily achieved, and, in addition, it is possible to prevent switch contact-induced sparking and wear as well as damages imparted to the peripheral electronic equipment and electronic circuitry as occurred in the drive switches or torque detection mechanisms that use conventional mechanical switch mechanisms, so that the constituting parts are able to have a reduced size and an extended life.

Furthermore, in like manner as described earlier, the stop-control of the drive control circuit of the brushless motor is performed when the load current detected by the load current detection means exceeds a set value; and in this case, a setting is made so that the drive power for the brushless motor is interrupted, the semiconductor that comprises the bridge configuration of the inverter circuit provided in the brushless motor drive control circuit is ON/OFF control-operated so as to short-circuit the magnetizing windings of the brushless motor, and the rotor is braked; as a result, the rotor of the brushless motor is braked abruptly, and torque control precision is even further enhanced.

Accordingly, in view of the above, the object of the present invention is to provide a rotary tool driven by a brushless motor with which constant torque tightening work for screws or the like can always be performed properly and efficiently, overall downsizing and improved torque control precision enhancement of the rotary tool can be easily achieved, and, in addition, it is possible to prevent switch contact-induced sparking and wear as well as damages imparted to the peripheral electronic equipment and electronic circuitry as occurred in the drive switches or torque detection mechanisms that use conventional mechanical switch mechanisms, so that the constituting parts of the rotary tool are able to have a reduced size and an extended life.

Means for Solving the Problems

In order to accomplish the above object, the rotary tool driven by a brushless motor described in claim 1 of the present invention is characterized in that it is comprised of: a DC brushless motor for rotationally driving a rotary bit, a torque setting clutch mechanism provided in a shaft-coupling portion coupling the rotary bit and the output shaft of the brushless motor, a drive switch for drive-controlling a drive control circuit of the brushless motor, and a control means configured so as to stop the rotational drive of the brushless motor by detecting clutch action of the clutch mechanism; and this rotary tool is characterized in that:

first Hall elements for respectively detecting a lever operation and a push operation are respectively provided for a lever operation mechanism and a push operation mechanism, both being the drive switch for the brushless motor, and also a second Hall element for detecting clutch action is provided for the clutch mechanism; and the control means is configured so that, based on the drive switch operation signal by the first Hall elements, the drive control circuit of the brushless motor is drive-controlled so as to rotationally drive the brushless motor and so that, based on a clutch mechanism action signal from the second Hall element, the drive control circuit of the brushless motor is stop-controlled so as to stop the rotational drive of the brushless motor.

In the rotary tool driven by a brushless motor described in claim 2 of the present invention, it is characterized in that a forward/reverse switching operation mechanism for performing forward/reverse switching operations for the brushless motor is further provided, and also a third Hall element for detecting forward/reverse switching operations is provided for the forward/reverse switching operation mechanism; and based on the forward/reverse switching operation signal from the third Hall element, the brushless motor is rotated forward or rotated in reverse through the control means.

In the rotary tool driven by a brushless motor described in claim 3 of the present invention, it is characterized in that the above-described brushless motor drive control circuit is comprised of: an AC/DC conversion means connected to a commercial power source for obtaining a power supply voltage for driving the brushless motor, an inverter circuit comprising a semiconductor bridge configuration for converting the power supply voltage into a brushless motor drive voltage, a drive circuit for appropriately ON/OFF-controlling the semiconductor that comprises the bridge configuration of the inverter circuit, and a position detection circuit for detecting the position of the rotor of the brushless motor to the magnetizing windings of the brushless motor; and the control means outputs to the drive circuit a control signal which is for switching the current supplied to the magnetizing windings by a position detection signal detected by the position detection circuit.

In the rotary tool driven by a brushless motor described in claim 4 of the present invention, it is characterized in that setting is effected so that when stop-control of the drive control circuit of the brushless motor is performed by the control means based on the clutch mechanism action signal provided by the second Hall element, a drive power for the brushless motor is interrupted, and the semiconductor that comprises the bridge configuration of the inverter circuit provided in the drive control circuit of the brushless motor is control-operated so as to short-circuit the magnetizing windings of the brushless motor, thus braking the rotor of the brushless motor.

In the rotary tool driven by a brushless motor described in claim 5 of the present invention, it is characterized in that setting is effected so that, when a lever operation or push operation of the lever operation mechanism or push operation mechanism, both being the brushless motor drive switch, is suspended, the semiconductor that comprises the bridge configuration of the inverter circuit provided in the drive control circuit of the brushless motor is control-operated so as to short-circuit the magnetizing windings of the brushless motor, thus braking the rotor of the brushless motor and stopping the brushless motor.

In the rotary tool driven by a brushless motor described in claim 6 of the present invention, it is characterized in that the rotary tool is comprised of: a DC brushless motor for rotationally driving a rotary bit, a load current detection means for detecting a load current of the brushless motor, a drive switch for drive-controlling the drive control circuit of the brushless motor, and a control means configured so as to rotationally drive the brushless motor by the operation of the drive switch and so as to stop the rotational drive of the brushless moor when the load current detected by the load current detection means exceeds a predetermined set value; and this rotary tool is characterized in that:

- first Hall elements for respectively detecting the lever operation and the push operation are respectively provided for the lever operation mechanism and the push operation mechanism, both being the drive switch for the brushless motor; and
- the control means is configured so that, based on a drive switch operation signal by the first Hall elements, the drive control circuit of the brushless motor is drive-controlled so as to rotationally drive the brushless motor and so that, when the load current detected by the load current detection means exceeds the set value, then the drive control circuit of the brushless motor is stop-controlled so as to stop the rotational drive of the brushless motor.

In the rotary tool driven by a brushless motor described in claim 7 of the present invention, it is characterized in that a forward/reverse switching operation mechanism for performing forward/reverse switching operations for the brushless motor is further provided, and a third Hall element for detecting forward/reverse switching operations is also provided for the forward/reverse switching operation mechanism; and based on the forward/reverse switching operation signal by the third Hall element, the brushless motor is rotated forward or rotated in reverse through the control means.

In the rotary tool driven by a brushless motor described in claim 8 of the present invention, it is characterized in that the drive control circuit of the brushless motor is comprised of an AC/DC conversion means connected to a commercial power source for obtaining a power supply voltage for driving the brushless motor, an inverter circuit comprising a semiconductor bridge configuration for converting the power supply voltage into a brushless motor drive voltage, a drive circuit for appropriately ON/OFF-controlling the semiconductor that comprises the bridge configuration of the inverter circuit, and a position detection circuit for detecting the position of the rotor of the brushless motor to the magnetizing windings of the brushless motor; and the control means outputs to the drive circuit a control signal which is for switching the current supplied to the magnetizing windings by a position detection signal detected by the position detection circuit.

In the rotary tool driven by a brushless motor described in claim 9 of the present invention, it is characterized in that setting is effected so that stop-control of the drive control circuit of the brushless motor is performed by the control means when the load current detected by the load current detection means exceeds a set value; and this stop-control of the drive control circuit of the brushless motor is performed by interrupting the drive power for the brushless motor, and the semiconductor that comprises the bridge configuration of the inverter circuit provided in the drive control circuit of the brushless motor is operated so as to short-circuit the magnetizing windings of the brushless motor, thus braking the rotor of the motor.

In the rotary tool driven by a brushless motor described in claim 10 of the present invention, it is characterized in that setting is effected so that, when the lever operation or push operation of the lever operation mechanism or push operation mechanism, both being the brushless motor drive switch, is suspended, then the semiconductor that comprises the bridge configuration of inverter circuit provided in the drive control circuit of the brushless motor is operated so as to short-circuit the magnetizing windings of the brushless motor, and brushless motor stop-control is effected for braking the rotor.

Advantages of Invention

According to the rotary tool driven by a brushless motor described in claim 1 of the present invention, the operations are detection actions effected by the drive switches and torque setting clutch mechanism are made non-contact, so that constant torque tightening work for screws or the like can always be done properly and efficiently, overall control means downsizing and improved torque control precision enhancement can be easily achieved, and, in addition, it is possible to prevent switch contact-induced sparking and wear as well as damages imparted to the peripheral electronic equipment and electronic circuitry as occurred in the drive switches or torque detection mechanisms that use conventional mechanical switch mechanisms, so that the constituting parts are able to have a reduced size and an extended life.

According to the rotary tool driven by a brushless motor described in claim 6 of the present invention, by making drive switch operation non-contact and also allowing the load current detection means to perform set torque detection actions, constant torque tightening work for screws or the like can always be done properly and efficiently, overall control means downsizing and improved torque control precision enhancement can be easily achieved, and, in addition, it is possible to prevent switch contact-induced sparking and wear as well as damages imparted to the peripheral electronic equipment and electronic circuitry as occurred in the drive switches or torque detection mechanisms that use conventional mechanical switch mechanisms, so that the constituting parts are able to have a reduced size and an extended life.

According to the rotary tool driven by a brushless motor described in claims 2 and 7 of the present invention, even when a brushless motor forward/reverse switching operation mechanism is provided that is capable of both fastening and unfastening screws, since the forward/reverse switching operation mechanism is a non-contact structure, the same outstanding benefits as described above can be expected.

According to the rotary tool driven by a brushless motor described in claims 3 and 8 of the present invention, the drive control circuit of the brushless motor can be compact and be integrated and easily combined with the respective Hall elements inside the grip casing of the rotary tool, so that the overall rotary tool manufacturing cost can be low.

According to the rotary tool driven by a brushless motor described in claims 4 and 9 of the present invention, the brushless motor drive control circuit is configured so that in a screw tightening operation, the stop-control of the brushless motor upon completion of the screw tightening work by a prescribed screw tightening torque is effected by a sudden braking of the rotor by way of short-circuiting the magnetizing windings of the brushless motor; as a result, torque control precision enhancement can be easily realized.

According to the rotary tool driven by a brushless motor described in claims 5 and 10 of the present invention, for the lever operation mechanism or push operation mechanism, both being the drive switch for the brushless motor, even in cases where the lever operation or push operation is suspended, by way of an sudden braking of the rotor caused by short-circuiting the magnetizing windings of the brushless motor, the suspended condition for the lever operation or push operation is sustained, as in the above-described brushless motor stop control; accordingly, proper and smooth control operations for the rotary tool can be realized not only when attaching a screw but also when removing a screw.

BEST MODE FOR CARRYING OUT THE INVENTION

Next, embodiments of the rotary tool driven by a brushless motor according to the present invention will be described in detail with reference to the accompanying drawings.

Embodiment 1

Figure 1:
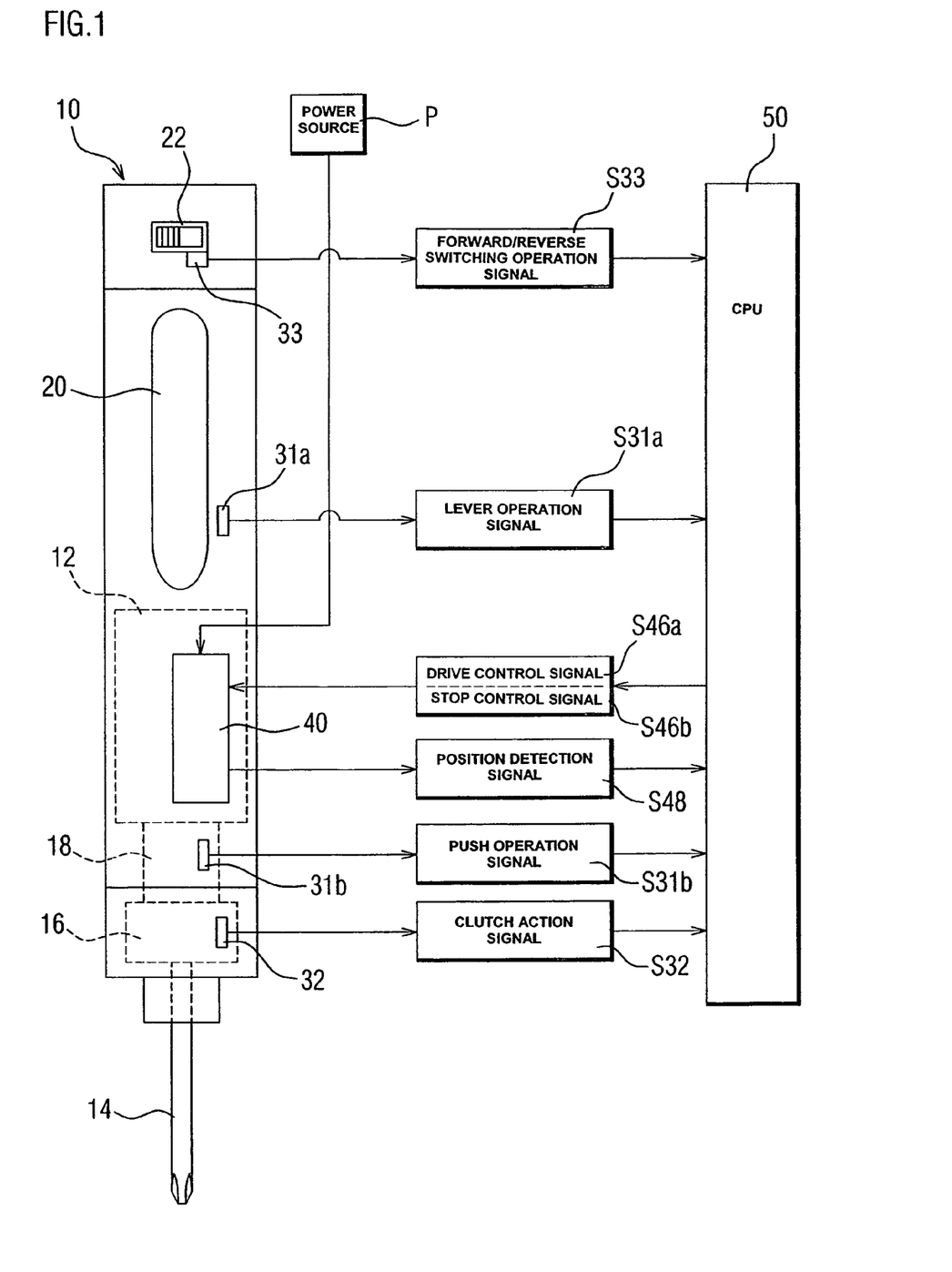
FIG. 1 An explanatory diagram showing the configuration of and control system for a brushless motor-driven driver as one embodiment of the rotary tool driven by a brushless motor according to the present invention.

FIG. 1 is an explanatory diagram showing the configuration of and control system of a brushless motor-driven driver that uses a driver bit as its rotary bit, which is as one embodiment of the rotary tool driven by a brushless motor according to the present invention. More specifically, in FIG. 1, the reference numeral 10 designates a brushless motor-driven driver that houses a brushless motor 12 internally. In this brushless motor-driven driver 10, a follower shaft for coupling and holding a driver bit 14 is coupled through an appropriate speed reduction mechanism to an output shaft of the brushless motor 12; and a torque setting clutch mechanism 16, which includes a cam engagement unit that acts to release the engagement between the motor output shaft and follower shaft when a load torque equal to or greater than a prescribed preset value acts on the follower shaft, is provided. In the coupling portion for coupling the follower shaft and the output shaft of the brushless motor 12, moreover, a push operation mechanism 18 is provided. This push operation mechanism 18 has a drive switch function that works when the driver bit 14 is axially displaced by a push operation in the radial direction. Furthermore, on the outside surface of the grip casing of the brushless motor-driven driver that houses the brushless motor 12 therein, a lever operation mechanism 20 having a drive switch function is provided, and further a forward/reverse switching operation mechanism 22 for effecting the forward/reverse switching operations of the brushless motor 12 is provided.

In the brushless motor-driven driver 10 of the shown embodiment, as seen from FIG. 1, first Hall elements 31a and 31b, which are combined with suitable detection magnets so as to be magnetic sensors, are respectively provided for the lever operation mechanism 20 and the push operation mechanism 18, which are respectively the drive switch for the brushless motor 12. In addition, for the torque setting clutch mechanism 16, a second Hall element 32, which is combined with a suitable detection magnet so as to be a magnetic sensor, is provided. Furthermore, for the forward/reverse switching operation mechanism 22, a third Hall element 33, which is combed with a suitable detection magnet so as to be a magnetic sensor, is provided.

In this structure, the first Hall elements 31a and 31b can be provided, respectively, for the lever operation mechanism 20 and the push operation mechanism 18, both being the drive switch, in like manner as the magnetic sensors (33b and 31b) provided for the drive switches (32 and 30) disclosed in Japanese Patent Application Laid-Open (Kokai) No. 2002-254346 (Patent Literature 2), for example. Also, the above-described second Hall element 32 can be provided for the torque setting clutch mechanism 16 in like manner as the magnetic sensor (44) provided for the torque detection mechanism (42) disclosed in Japanese Patent Application Laid-Open (Kokai) No. 2002-321166 (Patent Literature 3), for example.

Figure 2:
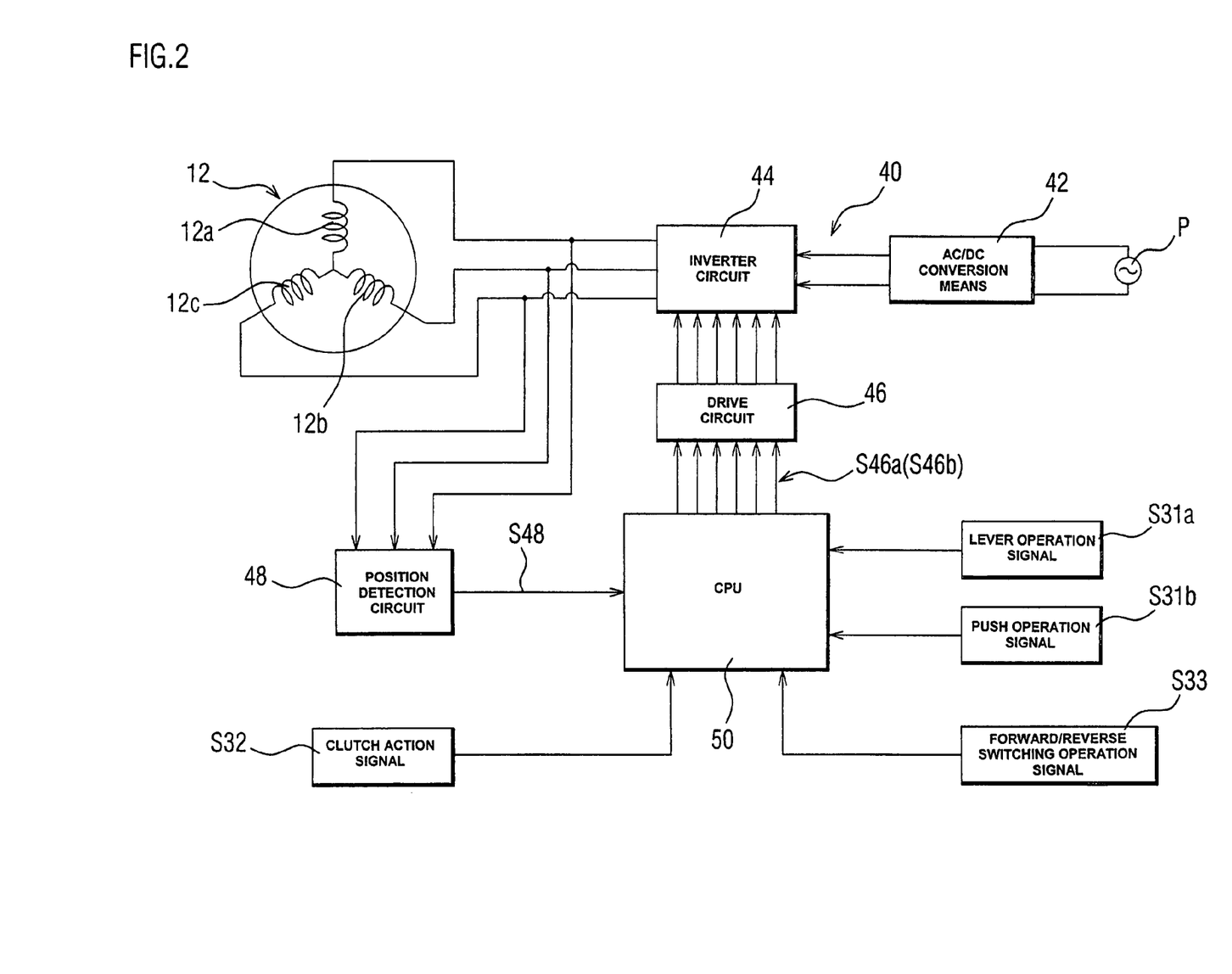
FIG. 2 A control system schematic illustration of an embodiment of the brushless motor control means in the rotary tool driven by a brushless motor according to the present invention.

Meanwhile, a drive control circuit 40 is provided for and connected to the brushless motor 12. The drive control circuit 40 for the brushless motor 12 includes, as shown in FIG. 2: an AC/DC conversion means 42 connected to a commercial power source P for obtaining a power supply voltage for driving the brushless motor 12; an inverter circuit 44 comprised of a semiconductor three-phase full-wave bridge configuration for converting the power supply voltage into a drive voltage for the brushless motor 12; a drive circuit 46 for appropriately ON/OFF-controlling the semiconductor that comprises the bridge configuration of the inverter circuit 44; a position detection circuit 48 for detecting rotor positions relative to the magnetizing windings 12a, 12b and 12c of the brushless motor 12; and a control means 50 for outputting control signal to the drive circuit 46 for switching the current supplied to the magnetizing windings 12a, 12b and 12c by position detection signal detected by the position detection circuit 48.

In the brushless motor-driven driver 10 of the shown embodiment as constructed as described above, when the lever operation mechanism 20 or the push operation mechanism 18, which are respectively provided as a drive switch, is operated, a lever operation signal S31a or a push operation signal S31b obtained by detecting the operation condition of the either drive switch is output by the first Hall element 31a or 31b and then input into the control means 50. In the control means 50, based on the input of such a drive switch operation signal S31a or S31b, a drive control signal S46a is output to the drive circuit 46 provided in the drive control circuit 40 of the brushless motor 12, and the brushless motor 12 is drive-controlled through this inverter circuit 44. In this case, moreover, a configuration is made so that position detection signal S48 obtained by detecting the positions of the rotor with respect to the magnetizing windings 12a, 12b and 12c in the brushless motor 12 are output by the position detection circuit 48 provided in the drive control circuit 40 of the brushless motor 12 and then input into the control means 50, and so that in the control means 50 a control signal is obtained, as the above-described drive control signal S46a, for switching the current supplied to the magnetizing windings 12a, 12b and 12c of the brushless motor 12 through the drive circuit 46 and the inverter circuit 44 (see FIG. 1 and FIG. 2). The brushless motor-driven driver 10 thus performs the intended screw tightening work.

Next, the screw tightening work is performed by the brushless motor-driven driver 10; and when the required screw tightening torque value is reached, and the torque setting clutch mechanism 16 effects a clutch action, then a clutch action signal S32 obtained from the detection of that action condition is output by the second Hall element 32 and input into the control means 50. As a result, in the control means 50, based on the input of the clutch action signal S32 of the torque setting clutch mechanism 16, a stop control signal S46b is output to the drive circuit 46 provided in the drive control circuit 40 of the brushless motor 12, and as a result the brushless motor 12 is stopped through the inverter circuit 44 (see FIG. 1 and FIG. 2). The brushless motor-driven driver 10 thus finishes the intended screw tightening work.

In the shown embodiment, moreover, when performing removal of a screw, for example, it is necessary to reverse-drive the brushless motor 12. In such cases, setting is made so that the forward/reverse switching operation mechanism 22 is operated, and a forward/reverse switching operation signal S33 obtained from the detection of the forward turning or reverse turning condition is output by the third Hall element 33 and then input into the control means 50; then, in the control means 50, based on the forward/reverse switching operation signal S33, the drive control signal S46a is output into the drive circuit 46 provided in the drive control circuit 40 of the brushless motor 12, and the drive control is effected so as to rotate brushless motor 12 forward or reverse the through the inverter circuit 44 (see FIG. 1 and FIG. 2).

In the above embodiment, moreover, a stop-control of the brushless motor 12 can be made by way of setting so that the clutch action signal S32 of the torque setting clutch mechanism 16 is input into the control means 50, and then the control means 50 outputs a stop control signal S46b to the drive circuit 46 provided in the drive control circuit 40 of the brushless motor 12; as a result, the drive power to the brushless motor 12 is interrupted, and the semiconductor that comprises the inverter circuit 44 bridge configuration provided in the drive control circuit 40 of the brushless motor 12 is operated so as to short-circuit the magnetizing windings 12a, 12b and 12c of the brushless motor 12, thus abruptly braking the rotor of the motor.

Next, a control program for performing the drive control and stop-control on the brushless motor 12 associated with a screw tightening work by the brushless motor-driven driver 10 of the shown embodiment as described above will be described with reference to the flowchart of FIG. 3.

At the start of screw tightening work, the forward/reverse switching operation mechanism 22 is first operated, and a determination is made to drive-control the brushless motor 12 in forward or in reverse (STEP-1). This operating of the forward/reverse switching operation mechanism 22 is detected by the third Hall element 33, and the forward/reverse switching operation signal S33 thus obtained is output, and it is input into the control means 50. Then, in the control means 50, with the drive control signal S46a output to the drive circuit 46 provided in the drive control circuit 40 of the brushless motor 12, drive control is effected so as to rotate the brushless motor 12 in forward direction or in reverse direction.

Next, the lever operation mechanism 20 or push operation mechanism 18, which are respectively a drive switch, is operated (STEP-2). In this case, the operation signal S31a or S31b based on the drive switch lever operation or push operation is output by the first Hall element 31a or 31b, and then the signal is input into the control means 50. Then, in the control means 50, the drive control signal S46a is output to the drive circuit 46 provided in the drive control circuit 40 of the brushless motor 12, and the brushless motor 12 is drive-controlled through the inverter circuit 44 (STEP-3). The intended screw tightening work is thus performed by the brushless motor-driven driver 10.

When the screw tightening work is accomplished by the brushless motor-driven driver 10, the torque setting clutch mechanism 16 effects a clutch action (STEP-4). As a result, a clutch action signal S32 is output by the second Hall element 32, and then it is input into the control means 50. Then, by the control means 50, a stop control signal S46b is output into the drive circuit 46 provided in the drive control circuit 40 of the brushless motor 12, and the brushless motor 12 is stop-controlled through the inverter circuit 44 (STEP-5). The intended screw tightening work by the brushless motor-driven driver 10 is thus completed. When the screw tightening work is to be continued, the above-described steps, namely STEP-2 to STEP-5, are repeated.

When performing stop-control on the brushless motor 12 (STEP-5), as described earlier, the drive power to the brushless motor 12 is interrupted, and, together therewith, the semiconductor that comprises the bridge configuration of the inverter circuit 44 provided in the drive control circuit 40 of the brushless motor 12 is operated so as to short-circuit the magnetizing windings 12a, 12b and 12c of the brushless motor 12, thus abruptly braking the rotor of the motor.

In the above embodiment, in the operation of the lever operation mechanism 20 or push operation mechanism 18, both being the drive switch (STEP-2), when the lever operation or push operation is suspended (STEP-6), stop-control is effected on the brushless motor 12 as in the above-described STEP-5 (STEP-7). In other words, in this case, the drive power to the brushless motor 12 is interrupted, and, together therewith, the semiconductor comprised of the bridge configuration of the inverter circuit 44 provided in the drive control circuit 40 of the brushless motor 12 is operated so as to short-circuit the magnetizing windings 12a, 12b and 12c of the brushless motor 12, thus braking the rotor abruptly.

Embodiment 2

Figure 4:
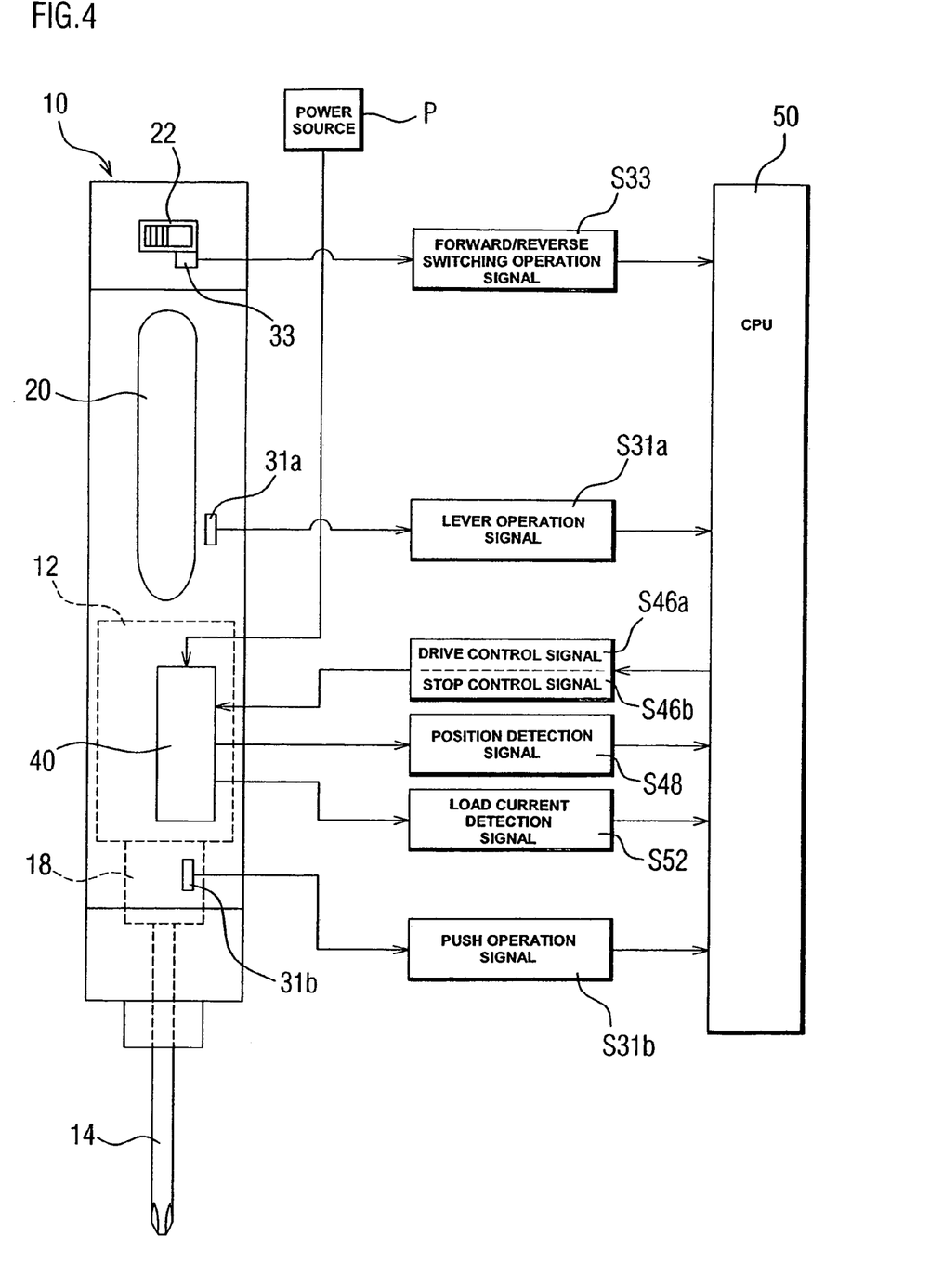
FIG. 4 An explanatory diagram showing the configuration of and control system for a power driver as another embodiment of the rotary tool driven by a brushless motor according to the present invention.

FIG. 4 is an explanatory diagram showing the configuration of and control system for a brushless motor-driven driver of another embodiment of the rotary tool driven by a brushless motor according to the present invention. To facilitate the description, the same reference numerals are used for the components that are the same as those in Embodiment 1 shown in FIG. 1 described above, and detailed description thereof will be omitted. In the brushless motor-driven driver 10' of this embodiment, the torque setting clutch mechanism 16 of the above-described embodiment is not used, and instead a load current detection means (not shown) is provided in the drive control circuit 40 of the brushless motor 12. Otherwise, the configuration of the Embodiment 2 is basically the same as that of the rotary tool 10 of the above-described Embodiment 1.

Figure 3:
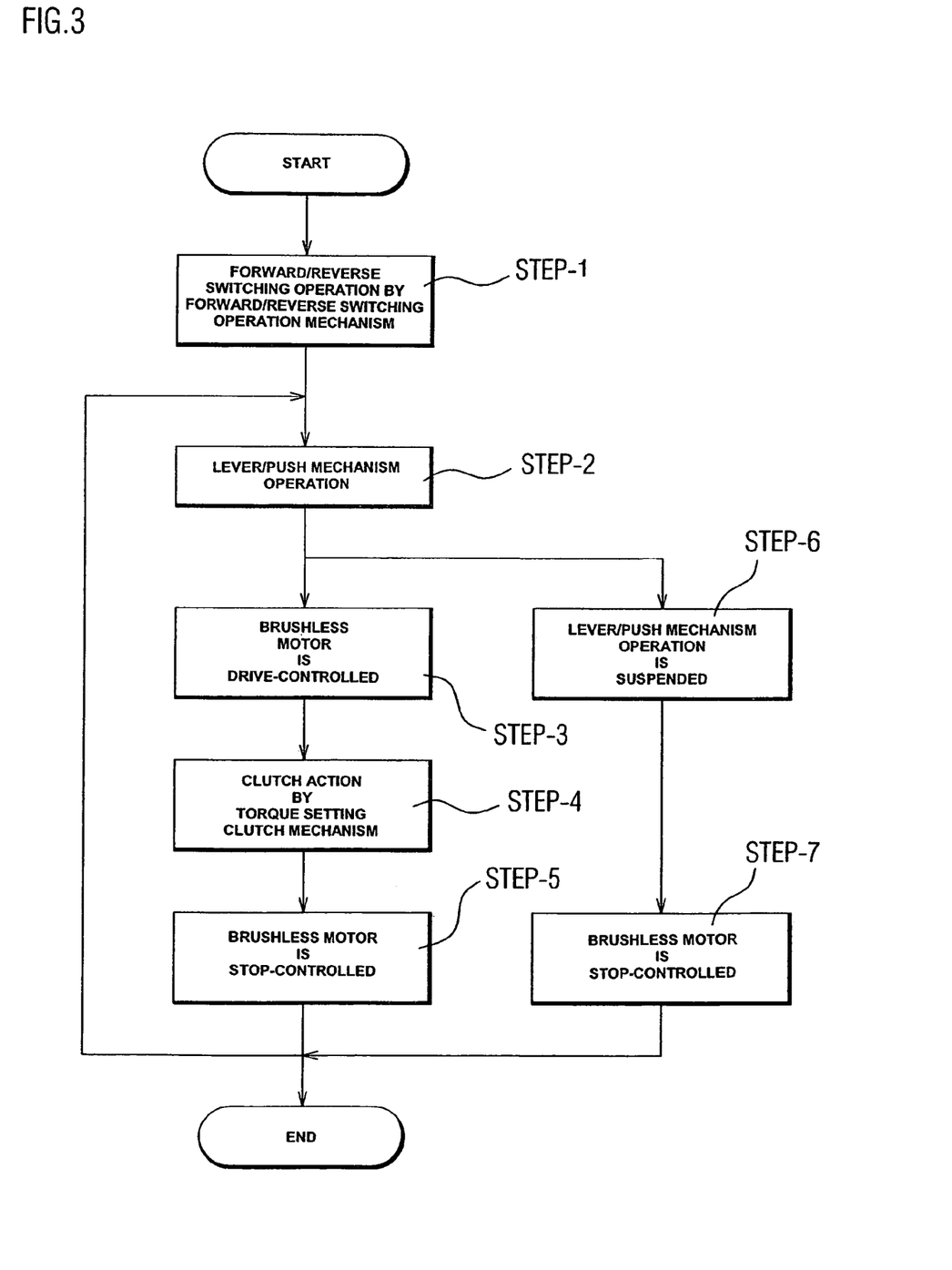
FIG. 3 A flowchart for a control action program for a brushless motor in a rotary tool driven by a brushless motor according to the present invention.

In this Embodiment 2, the drive switch actions when driving the brushless motor 12 are the same as in the previously described embodiment (see STEP-1 to STEP-3 in FIG. 3). When screw tightening work is performed by the brushless motor-driven driver 10', and the required screw tightening torque is reached instead of the clutch action by the torque setting clutch mechanism 16 described earlier (see STEP-4 in FIG. 3), a load current detection signal S52 detected by the load current detection means (not shown) is input into the control means 50. Then, in this control means 50, the input load current detection signal S52 is compared with a certain preset value; and when the input load current detection signal S52 exceeds the preset value, a stop control signal S46b is output to the drive circuit 46 provided in the drive control circuit 40 of the brushless motor 12, and the brushless motor 12 is stop-controlled through the inverter circuit 44 (see STEP-5 in FIG. 3). As a result, the brushless motor-driven driver 10' finishes the intended screw tightening work.

In this embodiment, as in the embodiment described earlier, when stop-control of the brushless motor 12 (see STEP-5 in FIG. 3) is performed, such setting can be provided that the drive power to the brushless motor 12 is interrupted, and the semiconductor that comprises the bridge configuration of the inverter circuit 44 provided in the drive control circuit 40 of the brushless motor 12 is operated so as to short-circuit the magnetizing windings 12a, 12b and 12c of the brushless motor 12, thus abruptly braking the rotor of the motor.

In this embodiment as well, as in the embodiment described earlier, during the operation of the lever operation mechanism 20 or push operation mechanism 18, which are the drive switch (see STEP-2 in FIG. 3), such setting can be provided that when the lever operation or push operation is suspended (see STEP-6 in FIG. 3), then stop-control is effected on the brushless motor 12 as in the above-described STEP-5 (see STEP-7 in FIG. 3).

In the above, respective descriptions of the preferred embodiments of the present invention are described; however, the present invention is not limited to or by the brushless motor-driven drivers of the embodiments described above, and it is possible to apply the present invention to various types of rotary tools that can be respectively drive-controlled by a brushless motor, and it is possible to make many other structural modifications within a scope that does not depart from the essence of the present invention.

DESCRIPTION OF THE REFERENCE SYMBOLS 10, 10' brushless motor-driven driver
12 brushless motor
12a, 12b, 12c magnetizing windings
14 driver bit
16 torque setting clutch mechanism
18 push operation mechanism
20 lever operation mechanism
22 forward/reverse switching operation mechanism
31a first Hall element
31b first Hall element
32 second Hall element
33 third Hall element
40 brushless motor-driven control circuit
42 AC/DC conversion means
44 inverter circuit
46 drive circuit
49 position detection circuit
50 control means (CPU)
P commercial power source
S31a lever operation signal
S31b push operation signal
S32 clutch action signal
S33 forward/reverse switching operation signal
S46a drive control signal
S46b stop control signal
S48 position detection signal
S52 load current detection signal

The invention claimed is:

1. A method of operating a rotary tool driven by a brushless motor comprising:
  a DC brushless motor for rotationally driving a rotary bit,
  a torque setting clutch mechanism provided in a shaft-coupling portion for coupling said rotary bit and an output shaft of said brushless motor,
  a drive switch for drive-controlling a drive control circuit of said brushless motor, and
  a control means configured so as to rotationally drive said brushless motor by an operation of said drive switch and so as to stop a rotational drive of said brushless motor by detecting clutch action of said clutch mechanism, wherein:
  first Hall elements for respectively detecting a lever operation and a push operation are respectively provided for a lever operation mechanism and a push operation mechanism both being said drive switch for said brushless motor, a second Hall element for detecting a clutch action is provided for said dutch mechanism, and a third Hall element for detecting forward/reverse switching operation is provided for a forward/reverse switching operation mechanism that performs forward/reverse switching operation of said blushless motor;
  said control means is configured so that, based on a drive switch operation signal provided by one of said first Hall elements, said drive control circuit of said brushless motor is drive-controlled so as to rotationally drive said brushless motor and so that, based on a clutch mechanism action signal provided by said second Hall element, said drive control circuit of said brushless motor is stop-controlled so as to stop the rotational drive of said brushless motor; and
  said brushless motor drive control circuit is comprised of: an internal AC/DC conversion means connected to an external commercial power source for obtaining a power supply voltage for driving said brushless motor, an inverter circuit comprising a semiconductor bridge configuration that converts said power supply voltage into a brushless motor drive voltage, a drive circuit for ON/OFF-controlling a semiconductor that comprises said bridge configuration of said inverter circuit, and a position detection circuit for detecting a position of a rotor with respect to magnetizing windings in said brushless motor;
  wherein said method comprises:
  a first step for, when stop-control of said drive control circuit of said brushless motor is performed by said control means based on said clutch mechanism action signal provided by said second Hall element, interrupting a drive power for said brushless motor and further control-operating said semiconductor, which comprises said bridge configuration of said inverter circuit provided in said drive control circuit of said brushless motor, so as to short-circuit said magnetizing windings of said brushless motor, thus braking said rotor of said brushless motor;
  a second step for rotating forward or in reverse said brushless motor through said control means based on a forward/reverse switching operation signal provided by said third Hall element; and
  a third step for, based on an operation suspension signal of said drive switch provided by the first Hall elements, control-operating said semiconductor, which comprises said bridge configuration of said inverter circuit provided in said drive control circuit of said brushless motor, so as to short-circuit said magnetizing windings of said brushless motor, thus braking said rotor of said brushless motor and stopping said brushless motor, said third step being executed when, during forward or reverse rotation of said brushless motor, a lever operation or push operation of said lever operation mechanism or push operation mechanism, both being said drive switch, is suspended.

2. A method of operating a rotary tool driven by a brushless motor comprising:

a DC brushless motor for rotationally driving a rotary bit, a load current detection means for detecting a load current of said brushless motor, a drive switch for drive-controlling a drive control circuit of said brushless motor, and a control means configured so as to rotationally drive said brushless motor by an operation of said drive switch and so as to stop a rotational drive of said brushless motor when a load current detected by said load current detection means exceeds a predetermined set value, wherein:

first Hall elements for respectively detecting a lever operation and a push operation are respectively provided for a lever operation mechanism and a push operation mechanism both being said drive switch for said brushless motor, and a third Hall element for detecting forward/reverse switching operation is provided for a forward/reverse switching operation mechanism that performs forward/reverse switching operation of said blushless motor;

said control means is configured so that, based on a drive switch operation signal provided by one of said respective first Hall elements, said drive control circuit of said brushless motor is drive-controlled so as to rotationally drive said brushless motor and so that, when a load current detected by said load current detection means exceeds a set value, said drive control circuit of said brushless motor is stop-controlled so as to stop the rotational drive of said brushless motor; and said brushless motor drive control circuit is comprised of:
an internal AC/DC conversion means connected to an external commercial power source for obtaining a power supply voltage for driving said brushless motor, an inverter circuit comprising a semiconductor bridge configuration that converts said power supply voltage into a brushless motor drive voltage, a drive circuit for ON/OFF-controlling a semiconductor that comprises said bridge configuration of said inverter circuit, and a position detection circuit for detecting a position of a rotor with respect to magnetizing windings in said brushless motor;

wherein said method comprises:

a first step for interrupting a drive power for said brushless motor, when a load current detection signal that is detected by said load current detection means to exceed a set value which has been set previously, by way of outputting stop control signal to a drive circuit provided in the drive control circuit of the blushless motor, said first step further control-operating said semiconductor, which comprises said bridge configuration of said inverter circuit provided in said drive control circuit of said brushless motor, so as to short-circuit said magnetizing windings of said brushless motor, thus braking said rotor of said brushless motor;

a second step for rotating forward or in reverse said brushless motor through said control means based on a forward/reverse switching operation signal provided by said third Hall element, and a third step for, based on an operation suspension signal of said drive switch provided by the first Hall elements, control-operating said semiconductor, which comprises said bridge configuration of said inverter circuit provided in said drive control circuit of said brushless motor, so as to short-circuit said magnetizing windings of said brushless motor, thus braking said rotor of said brushless motor and stopping said brushless motor, said third step being executed when, during forward or in reverse rotation of said brushless motor, a lever operation or push operation of said lever operation mechanism or push operation mechanism, both being said drive switch, is suspended.

3. A method for operating a rotary tool driven by a brushless motor, said rotary tool comprising:

a DC brushless motor for rotationally driving a rotary bit;

a torque setting clutch mechanism in a shaft coupling portion for coupling said rotary bit and an output shaft of said brushless motor, a drive switch for drive-controlling a drive control circuit of said brushless motor;

a control means configured so as to rotationally drive said brushless motor by an operation of said drive switch and so as to stop a rotational drive of said brushless motor by detecting clutch action of said clutch mechanism;

first Hall elements for respectively detecting a lever operation and a push operation of a lever operation mechanism and a push operation mechanism, both being said drive switch of said brushless motor;

a second Hall element for detecting a clutch action of said clutch mechanism;

a forward/reverse switching operation mechanism for performing forward/reversing switching operation of said brushless motor; and a third Hall element for detecting forward/reverse switching operation of said forward/reverse switching operation mechanism;

said control means being configured so that, based on a drive switch operation signal provided by one of said first Hall elements, said drive control circuit of said brushless motor being is drive controlled so as to rotationally drive said brushless motor and so that, based on a clutch mechanism action signal provided by said second Hall element, said drive control circuit of said brushless motor is stop-controlled so as to stop the rotational drive of said brushless motor; and said brushless motor drive control circuit being comprised of: an internal AC/DC conversion means connected to an external commercial power source for obtaining a power supply voltage for driving said brushless motor, an inverter circuit comprising a semiconductor bridge configuration that converts said power supply voltage into a brushless motor drive voltage, a drive circuit for ON/OFF-controlling a semiconductor that comprises said bridge configuration of said inverter circuit; and a position detection circuit for detecting a position of a rotor with respect to magnetizing windings in said brushless motor;

wherein said method comprises:

interrupting, when stop-contra of said drive control circuit of said brushless motors is performed by said control means, a drive power for said brushless motor based on said clutch mechanism action signal provided by said second Hall element, and control-operating said semiconductor that comprises said bridge configuration of said inverter circuit provided in said drive control circuit of said brushless motor so as to short circuit said magnetizing windings of said brushless motor, thus braking said rotor of said brushless motor;

control-operating, when a lever operation or push operation of said lever operation mechanism or push operation mechanism, both being a brushless motor drive switch, is suspended, said semiconductor that comprises said bridge configuration of said inverter circuit provided in said drive control circuit of said brushless motor so as to short circuit said magnetizing winding of said brushless motor, thus abruptly breaking said rotor of said brushless motor and stopping said brushless motor; and rotating, based on a forward/reverse switching operation signal provided by said third Hall element, said brushless motor forward or in reverse through said control means.

* * * * *